United States Patent [19]

Erdmannsdörfer et al.

[11] Patent Number: 4,516,990

[45] Date of Patent: May 14, 1985

[54] METHOD OF REMOVING SOOT FROM EXHAUST GASES

[75] Inventors: Hans Erdmannsdörfer, Ludwigsburg; Manfred Wagner, Stuttgart; Rudi Numrich, Weinstadt; Gerd Weyh, Leonberg-Eltingen, all of Fed. Rep. of Germany

[73] Assignee: Filterwerk Mann & Hummel GmbH, Ludwigsburg, Fed. Rep. of Germany

[21] Appl. No.: 631,088

[22] Filed: Jul. 16, 1984

[30] Foreign Application Priority Data

Jul. 14, 1983 [DE] Fed. Rep. of Germany ....... 3325391

[51] Int. Cl.³ .............................................. B01D 46/04
[52] U.S. Cl. ......................................... 55/96; 55/283; 55/466; 55/523; 55/DIG. 30; 60/295; 60/311; 423/215.5
[58] Field of Search .................. 55/96, 283, 466, 523, 55/DIG. 30; 60/311, 295; 423/215.5

[56] References Cited

U.S. PATENT DOCUMENTS 4,436,535 3/1984 Erdmannsdorfer et al. ........... 55/96

Primary Examiner—Bernard Nozick
Attorney, Agent, or Firm—Joseph A. Geiger

[57] ABSTRACT

A method of removing soot from the exhaust gases of internal combustion engines, especially of the diesel-type, using an exhaust filter which collects the soot and a dosing device which, when triggered by a pressure switch and a series-connected temperature switch, injects a dose of a combustion-inducing substance onto the soot layer with the aid of compressed air. The combustion-inducing substance consists of CuCl and $NH_4NO_3$ which are stored as a mixture in a single container or as separate ingredients in two containers.

9 Claims, 2 Drawing Figures

METHOD OF REMOVING SOOT FROM EXHAUST GASES

BACKGROUND OF THE INVENTION

1. Field of the Invention

The present invention relates to ways and means for the elimination of particulate pollutants from combustion gases and, more particularly, to a method of removing soot from exhaust gases of internal combustion engines, especially diesel engines, wherein the soot particles are filtered out of the exhaust gas flow and combusted with the aid of combustion-inducing substances.

2. Description of the Prior Art

In U.S. Pat. No. 4,436,535 to H. Erdmannsdörfer, M. Wagner and G. Weyh is disclosed a method and device for removing soot from the exhaust gases of an internal combustion engine, especially of the diesel-type, featuring a soot filter in the exhaust line and a dosing device which injects a dose of a combustion-inducing substance, preferably copper(I) chloride (CuCl), into the soot filter with the aid of a flow of compressed air.

The soot combustion process is initiated automatically, in response to the presence of a critical level of counter-pressure in the exhaust filter and the simultaneous presence of a sufficiently high temperature inside the soot filter. The critical pressure level is ascertained by means of a pressure switch and the critical temperature is monitored with a temperature probe which controls a thermal switch. The two switches are connected in series.

Following the air-carried injection of a dose of the combustion-inducing substance into the filter, additional compressed air is injected into the soot filter, through a line which bypasses the supply container, in order to supply additional oxygen for the combustion of the accumulated soot. This bypass flow also serves to scavenge the supply line downstream of the supply container.

Through the addition of copper(I) chloride, it is possible to lower the ignition temperature of the soot layer on the filter cartridge to approximately 350° Celsius. It thus becomes possible to burn off the soot without applying supplemental heat to the exhaust flow upstream of the soot filter, or directly to the soot layer, as was necessary before that. The result is not only a considerable saving in energy requirements, but also a marked lowering in the thermal stress to which the filter cartridge is subjected during the soot combustion process.

Practical experience with this prior solution under the most varied operating conditions has revealed that even the greatly lowered ignition temperature of 350° Celsius cannot always be reached in the soot filter with sufficient certainty. Such a situation may accur at very low ambient temperatures and/or when the internal combustion engine is operated for an extended period of time under low partial load, or when a supercharger is employed.

Another shortcoming of this known solution is the fact that small amounts of copper oxide are precipitated out of the combustion-induding copper(I) chloride. And, with the passage of operating time, a coating of copper oxide forms on the filter cartridge, which becomes a drawback to the efficient operation of the engine by increasing the flow resistance of the soot filter.

SUMMARY OF THE INVENTION

Underlying the present invention is the objective of further improving the soot combustion method which is disclosed in U.S. Pat. No. 4,436,535 by eliminating its aforementioned shortcomings through a further lowering of the soot ignition temperature and a simultaneous reduction of the tendency of copper oxide to precipitate out of the combustion-inducing substance onto the filter cartridge.

The present invention proposes to attain this objective by suggesting a method in which the combustion-inducing substance which is added to the accumulated soot on the filter cartridge to lower its ignition temperature is a mixture of copper(I) chloride (CuCl) and ammonium nitrate ($NH_4NO_3$).

Unexpectedly, it was discovered that the addition of ammonium nitrate to the known combustion-inducing copper(I) chloride produces several advantageous results:

On the one hand, the ignition temperature of the accumulated soot layer on the filter cartridge can be reduced to approximately 280° Celsius, while a smaller dose of copper(I) chloride is consumed.

On the other hand, the use of ammonium nitrate produces a substantial slowdown in the rate of deposit of copper oxide on the surface of the filter cartridge. As a result, the operational longevity of the soot filter is extended manifold.

Lastly, the comparatively low price of ammonium nitrate makes this novel method an extremely economical approach to the elimination of soot from diesel exhaust gas.

The mixing ratio at which copper(I) chloride and ammonium nitrate are employed in the proposed novel method may vary between 1 to 4 and 1 to 1 by weight, the weight ratio being preferably 1 to 2, i.e., two weight units of $NH_4NO_3$ for each weight unit of CuCl. Such a mixture assures the full effectiveness of the ammonium nitrate in lowering the soot ignition temperature.

The technical specifications for a dosing valve device processing this mixture are not very demanding, because the amounts metered out are not too small. On the other hand, the quantities of combustion-inducing ingredients required are not too large either, so that they can be stored in a container, or in containers, of tolerable size.

By using the known dosing device of U.S. Pat. No. 4,436,535, the copper(I) chloride and the ammonium nitrate can be feed to the dosing valve device as a mixture which is stored in a single supply container. Such a pre-mixed substance can be metered out satisfactorily at temperatures up to 75° Celsius.

For situations in which it is necessary to dose the ingredient mixture at higher temperatures, the invention further suggests the storage of the two ingredients CuCl and $NH_4NO_3$ in separate supply containers from which they are fed to the dosing valve device through a junction of two supply lines upstream of the first dosing valve.

By separately storing the two ingredients, the device can be operated satisfactorily at temperatures up to approximately 100° Celsius. The mixing of the ingredients in a supply line junction upstream of the dosing valve device eliminates the need for a second set o dosing valves, and the operation of the dosing valv device is the same, whether one or two supply contain ers are used.

BRIEF DESCRIPTION OF THE DRAWINGS

Further special features and advantages of the invention will become apparent from the description following below, when taken together with the accompanying drawing which illustrates, by way of example, a device for practicing the method of the present invention, the device being represented in the various figures as follows.

DESCRIPTION OF THE METHOD AND OF A DEVICE FOR PRACTICING THE METHOD

The device for practicing the method of the present invention is similar to the device which is disclosed and claimed in U.S. Pat. No. 4,436,535. The disclosure of this patent, to the extent that it is not repeated below, should be considered incorporated herein by reference.

Figure 1:
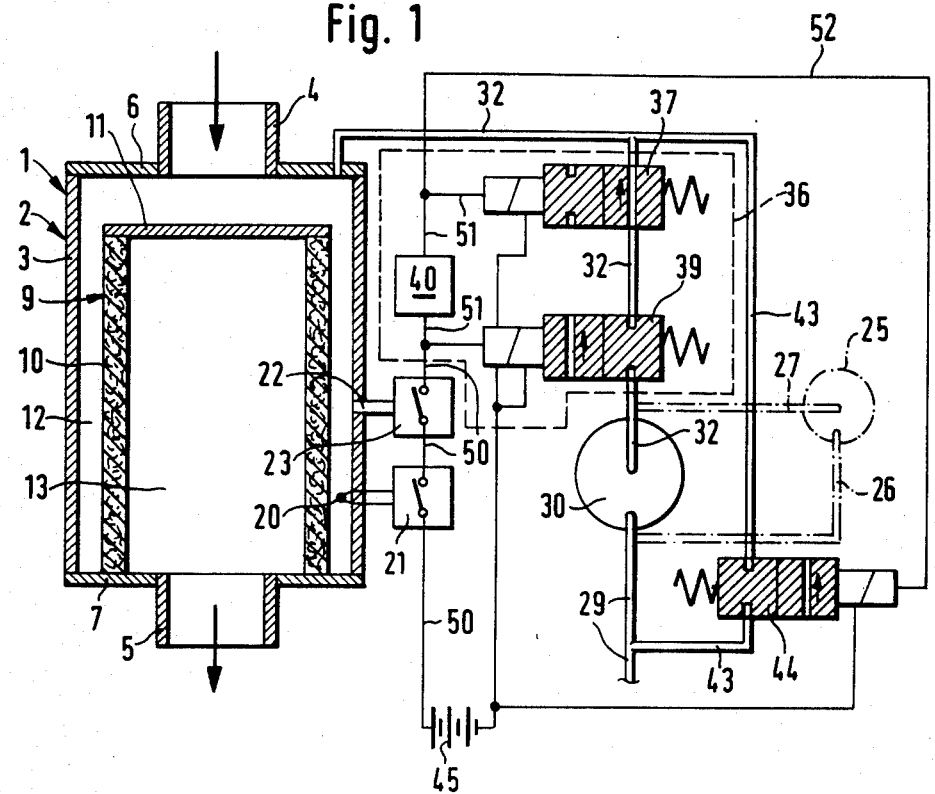
FIG. 1 shows, in a schematic representation, a soot combusting device designed for practicing the method of the present invention.

In the drawing, FIG. 1 shows, in a longitudinal cross section, a soot filter 1, as it would be arranged in a horizontal portion of the exhaust line of an internal combustion engine, particularly a diesel engine. The soot filter 1 has a filter housing 2 which consists of a cylindrical housing shell 3 with axially oppositely arranged inlet and outlet connectors 4 and 5 which are arranged in flat housing covers 6 and 7, respectively.

The filter housing 2 surrounds a filter cartridge 9 in the form of a filter cylinder 10 which is arranged concentrically inside the housing shell 3, having one axial end face sealingly attached to the end cover 7, on the outlet side of the soot filter 1, and its other axial end closed off by means of a cartridge end cover 11. The wall of the filter cylinder 10 is constituted of silicon dioxide (silica) fibers which form a soot-retaining filter structure which is also highly heat resistant. The filter cartridge 9 divides the interior space of the filter housing 2 into a raw gas chamber 12 upstream of the filter cylinder 10 and a clean gas chamber 134 downstream thereof.

In the wall of the housing shell 3 is arranged a temperature probe 20 to which is connected a thermal switch 21. The probe 20 monitors the temperature in the raw gas chamber 12 of the soot filter 1, closing the thermal switch 21, when the temperature is at, or above, a predetermined trigger level. Also arranged in the wall of the housing shell 3 is a connecting pipe 22 which leads to a pressure switch 23. The latter is normally open, but closes, when a predetermined pressure level is reached or exceeded in the raw gas chamber 12.

Figure 2:
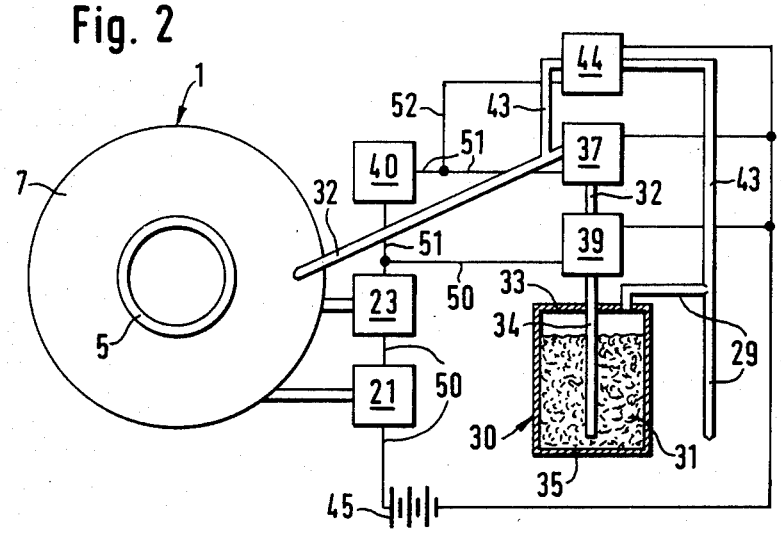
FIG. 2 shows the soot combusting device of FIG. 1 in a frontal elevation with partially rearranged control components.

The device of FIG. 1 also includes a source of compressed air (not shown) with a pressure line 29 leading to a container 30 which holds a supply of a combustion-inducing substance 31 (FIG. 2). This substance is preferably a mixture of pulverulent copper(I) chloride (CuCl) and ammonium nitrate (NH$_4$NO$_3$). The mixing ratio of the two ingredient powders may lie somewhere between 1 to 4 and 1 to 1, by weight, the preferred mixing ratio being 1 to 2 by weight.

Leading out of the supply container 30 is a supply line 2 which extends through the container cover 33, forming a vertical dip tube 34 with an inlet opening near the container bottom 35. The other end of the supply line 32 connected to the upstream end cover 6 of the filter housing 2, opening into the raw gas chamber 12. The flow in the supply line 32 is controlled by means of a dosing valve assembly 36 which consists essentially of two series-connected dosing valves 37 and 39 of the spring-returned, solenoid-operated type, and an electrical timing relay 40.

A bypass line 43 branches off the pressure line 29 and leads into the supply line 32, downstream of the dosing valve assembly 36, so as to provide a direct connection between the supply of compressed air and the raw gas chamber 12 of the soot filter 1. A shutoff valve 44 controls the flow in the bypass line 43. This valve is likewise of the spring-returned, solenoid-operated type, operating in conjunction with the dosing valves 37 and 39, as will be explained further below.

In operation, the exhaust gases of an internal combustion engine (not shown) flow through the soot filter 1 in the direction of the arrows shown in FIG. 1. As the gases flow radially inwardly through the filter cartridge 9, the fibers of the latter capture and retain any carbon particles which may have been produced by an incomplete combustion of the fuel in the internal combustion engine.

By building up a layer of soot on its upstream side, the filter cylinder 10 represents a gradually increasing flow resistance to the exhaust gases. It follows that the gas counter-pressure in the raw gas chamber 12 increases accordingly until, at a predetermined critical pressure level, the pressure switch 23 responds by closing.

The closing of the pressure switch 23, by itself, does not automatically initiate a soot combustion operation. For the latter to take place, it is also necessary to have a predetermined minimal temperature level present in the soot filter 1. Thus, the thermal switch 21 may be set for a threshold temperature, or trigger temperature, of 280° Celsius, for example. This threshold temperature is low enough that it is attained routinely during operation, even at very low ambient temperatures and/or under partial load conditions.

With the pressure switch 23 closed, due to a critical accumulation of soot on the filter cylinder 10, the actuation of the thermal switch 21 by the presence of a temperature in the soot filter 21 above the threshold temperature closes a valve actuation circuit over the electrical line 50 and the battery 45. This causes the first dosing valve 39 to be switched from its normally closed position to an open position. As the second dosing valve 37 is normally open, the opening of the first dosing valve 39 opens the supply line 32 between the container 30 and the soot filter 1.

The opening of the supply line 32 and the presence of air pressure inside the container 30 produce a flow of the soot-combusting substance 31 through the open supply line 32 into the raw gas chamber 12 of the filter housing 2. As the combustion-inducing substance 31—a mixture of CuCl and NH$_4$NO$_3$—enters the raw gas chamber 12, it is sprinkled over the surface of the soot layer on the filter cylinder 10 by the action of the exhaust gas flow and the jet of compressed air carrying it into the filter housing. By combining with the soot layer, the combustion-inducing mixture lowers the ignition temperature of the soot, so that the latter is combusted and transformed into carbon dioxide gas which passes through the filter cylinder 10.

The opening of the first dosing valve 39 also triggers a timing relay 40, so that, following the elapse of a predetermined length of time, the circuit of the second dosing valve 37 is closed over the electrical line 51, thereby closing the dosing valve 37 and interrupting the flow of the combustion-inducing substance 31. The time interval set on the timing relay 40 thus determines the amount of combustion-inducing substance which is dosed into the soot filter 1. At the end of the dosing operation, both dosing valves are in their actuated state, with compressed return springs, the first dosing valve 39 being open, and the second dosing valve 37 being closed.

Simultaneously with the closing of the second dosing valve 37, the timing relay 40 also closes another solenoid circuit over the electrical line 52, energizing the solenoid of the bypass shutoff valve 44. The latter moves from its normally closed position to an open position, thereby allowing compressed air to flow from the pressure line 29 into the supply line 32, just downstream of the closed second dosing valve 37. This flow of compressed air through the supply line 32, while scavenging the latter, provides additional oxygen for the combustion of the soot layer on the filter cylinder 10.

The arrangement of the supply line 32 downstream of the second dosing valve 37 with a continuous slope towards the soot filter 1, as indicated schematically in FIG. 2, prevents the accumulation of condensate in the supply line 32.

As the soot layer on the filter cartridge 9 burns off, the flow resistance across the wall of the filter cylinder 10 is rapidly reduced to a level at which the pressure switch 23 is de-activated and the line 50 is opened. The result is an interruption of the solenoid-energizing circuits and a spring-induced return of the three valves 37, 39 and 44 to their normal positions in which both the supply line 32 and the bypass line 43 are shut off.

FIG. 1 shows, in stippled lines, an optional modification of the soot combusting device in the form of a second, smaller supply container 25 with a pressure line 26 branching off the pressure line 29 and a supply line branch 27 joining the supply line 32 upstream of the first dosing valve 39. This arrangement provides for the supply container 30 to contain only ammonium nitrate and for the smaller supply container 25 to contain only copper(I) chloride.

The use of separate supply containers for the $NH_4NO_3$ powder and for the CuCl powder makes it possible to obtain satisfactory dosing of their contents at temperatures up to approximately 100° Celsius. On the other hand, when the two combustion-inducing substances pre-mixed and stored as a mixture in a single supply container, temperatures above 75° Celsius tend to produce a lump-forming chemical reaction in the mixture.

In view of the hygroscopic nature of the soot-combusting powders, the compressed air is preferably dehumidified before entering the supply container, or containers, by passing it through an appropriate drying means (not shown) in the pressure line 29.

The operation of the dosing valve assembly 36 with electrical switches and solenoid valves which are driven by the vehicle battery is simple and reliable, requiring only a minimum of supplemental energy for the soot removal process. However, instead of using electricity as the auxiliary energy, it is also possible to use compressed air, which then serves not only as a conveying medium for the soot-combusting substance, but also as a valve-actuating medium. In this case, the timing relay could be replaced by a simple throttling device. Alternatively, it is also possible to use hydraulic pressure for the operation of the dosing valve assembly.

It should be understood, of course, that the foregoing disclosure describes only a preferred mode of practicing the method of the invention and that it is intended to cover all changes and modifications of the disclosed example of the invention which fall within the scope of the appended claims.

We claim the following:

1. A method of removing soot form the exhaust gas of an internal combustion engine, particularly of a diesel engine, comprising the steps of:
    filtering the soot particles from the exhaust gas by means of an exhaust filter which retains and collects the soot;
    during operation of the engine, form time to time burning off the collected soot to a gas which passes through the exhaust filter by adding to the soot a dose of a flowable combustion-inducing substance which lowers the soot ignition temperature and by also adding a supply of combustion air, the combustion-inducing substance being a mixture of copper(I) chloride and ammonium nitrate;
    monitoring the temperature inside the exhaust filter and using the presence of an operating temperature above a predetermined level as a precondition for the initiation of the burn-off step; and
    monitoring the accumulation of soot in the exhaust filter, in terms of the resultant increase in the flow resistance across the filter, and using the presence of a predetermined flow resistance as a trigger condition for the initiation of the burn-off step.

2. A soot-removing method as defined in claim 1, wherein
    the two ingredients of the combustion-inducing substance are powders; and
    the step of burning off the soot involves the additional steps of pre-mixing the two ingredient powders and storing them as a mixture in a single supply container.

3. A soot-removing method as defined in claim 1, wherein
    the two ingredients of the combustion-inducing substance are powders; and
    the step of burning off the soot involves the additional steps of storing the two ingredient powders in two separate supply containers and mixing them just prior to use.

4. A soot-removing method as defined in claim 1, wherein
    the step of monitoring the exhaust filter temperature uses as said precondition a temperature level of approximately 280° Celsius.

5. A soot-removing method as defined in claim 1, wherein
    the step of burning off the soot includes the steps of
    blowing compressed air into the exhaust filter, on its upstream side, thereby providing said supply of combustion air; and
    metering said dose of combustion-inducing substance into the flow of compressed air, before the latter enters the exhaust filter.

6. A soot-removing method as defined in claim 5, wherein
    the steps of burning and metering involve the use of an air supply line into which the combustion-inducing substance is metered by a dosing valve; and the method further involves the step of scavenging the air supply line downstream of the dosing valve with compressed air, after termination of the metering step.

7. A soot-removing method as defined in claim 1, wherein
the step of burning off the soot involves the use of a combustion-inducing substance which is a mixture of copper(I) chloride and ammonium nitrate, at a weight ratio between 1 to 4 and 1 to 1.

8. A soot-removing method as defined in claim 7, wherein
the two ingredients of the combustion-inducing substance are powders; and
the step of burning off the soot involves the additional steps of pre-mixing the two ingredient powders and storing them as a mixture in a single supply container.

9. A soot-removing method as defined in claim 7, wherein
the two ingredients of the combustion-inducing substance are powders; and
the step of burning off the soot involves the additional steps of storing the two ingredient powders in two separate supply containers and mixing them just prior to use.

* * * * *